US009731447B2

(12) United States Patent
Benjamin et al.

(10) Patent No.: US 9,731,447 B2
(45) Date of Patent: Aug. 15, 2017

(54) ORIENTED POLYMER COMPOSITE ARTICLE, COMPOSITION AND METHOD OF MANUFACTURE

(75) Inventors: Michael Benjamin, Chicago, IL (US); Hung Jee, Chicago, IL (US)

(73) Assignee: James Hardie Technology Limited, Dublin (IE)

( * ) Notice: Subject to any disclaimer, the term of this patent is extended or adjusted under 35 U.S.C. 154(b) by 664 days.

(21) Appl. No.: 14/129,528

(22) PCT Filed: Jun. 27, 2012

(86) PCT No.: PCT/US2012/044446
§ 371 (c)(1),
(2), (4) Date: Mar. 27, 2014

(87) PCT Pub. No.: WO2013/003490
PCT Pub. Date: Jan. 3, 2013

(65) Prior Publication Data
US 2014/0203472 A1    Jul. 24, 2014

Related U.S. Application Data

(60) Provisional application No. 61/502,232, filed on Jun. 28, 2011.

(51) Int. Cl.
*B29C 47/12* (2006.01)
*B29C 47/00* (2006.01)
(Continued)

(52) U.S. Cl.
CPC .......... *B29C 47/12* (2013.01); *B29C 47/0019* (2013.01); *B29C 47/0057* (2013.01);
(Continued)

(58) Field of Classification Search
None
See application file for complete search history.

(56) References Cited

U.S. PATENT DOCUMENTS 5,474,722 A * 12/1995 Woodhams ......... B29C 47/0004
264/108
2009/0001629 A1  1/2009 Newson et al.
(Continued)

FOREIGN PATENT DOCUMENTS

WO   WO 2013/003490       1/2013

OTHER PUBLICATIONS

Raymond W. Meyer, Handbook of Pultrusion Technology, 1985 p. 41-50.*

(Continued)

*Primary Examiner* — Christopher Schatz
(74) *Attorney, Agent, or Firm* — Knobbe Martens Olson & Bear, LLP (57) ABSTRACT

The disclosure generally relates to a solid state non-proportional, adjustable, tapered drawing die and an oriented polymer article formed therefrom. More specifically, embodiments relate to a non-proportional draw die used to produce oriented, dimensionally accurate, symmetric or asymmetric polymer composite profiles having simple profiles or complicated profiles with multiple edges. Moreover, the draw die of the disclosure prevents natural flattening of the edges of the final profile during the solid state die drawing process of the oriented polymer composite.

7 Claims, 8 Drawing Sheets

(51) Int. Cl.
*B29C 47/54* (2006.01)
*B29C 47/92* (2006.01)
*B29C 47/38* (2006.01)
*B29C 47/14* (2006.01)

(52) U.S. Cl.
CPC .............. *B29C 47/14* (2013.01); *B29C 47/38* (2013.01); *B29C 47/54* (2013.01); *B29C 47/92* (2013.01); *B29C 2947/926* (2013.01); *B29C 2947/92704* (2013.01)

(56) References Cited

U.S. PATENT DOCUMENTS

| | | |
|---|---|---|
| 2009/0152759 A1 | 6/2009 | Malone et al. |
| 2010/0072660 A1 | 3/2010 | Achille |
| 2010/0301511 A1 | 12/2010 | Nichols et al. |

OTHER PUBLICATIONS

International Search Report and Written Opinion for corresponding PCT Application No. PCT/US2012/44446, filed Jun. 27, 2012, dated Aug. 31, 2012, 14 pages.

* cited by examiner

180
ORIENTED POLYMER COMPOSITE ARTICLE, COMPOSITION AND METHOD OF MANUFACTURE

BACKGROUND

Field of Invention

The present technology generally relates to oriented polymer composite (OPC) material and solid state draw dies used in conjunction with the manufacture of the OPC material.

Description of Related Art

Oriented polymer composite (OPC) articles can be formed by solid state die drawing process in conjunction with solid state extrusion process. To form an OPC article, a polymer composition is typically first pushed through an extruder using ram extrusion or hydrostatic extrusion processes. The extruded polymer billet is then pulled through a solid state draw die. The solid state draw die reduces the cross-sectional area of the polymer billet and causes it to converge toward the desired profile, thereby forming the OPC article.

Conventional wisdom appears to dictate that axisymmetric deformation and proportional draw dies are necessary to produce a dimensionally accurate OPC product. For example, U.S. Pat. No. 7,687,002 to Nichols et al. discloses the importance of using a substantially proportional draw die for balanced drawing of polymer compositions into shapes having non-circular cross sections. According to the '002 patent, substantially balanced drawing results from a drawing path where any polymer composition cross section is substantially proportional to any other polymer composition cross section and where the centroid of any polymer composition cross section lies on a substantially straight line that is parallel to the drawing direction. The '002 patent discloses that substantially balanced drawing offers a benefit of maintaining substantially proportional polymer cross sections despite changes in draw rate. The '002 patent further discloses that a substantially proportional die achieves streamline flow of a solid state polymer through the die while maintaining a final article cross section that is substantially proportional to a polymer composition draw channel cross section.

Efforts to produce dimensionally accurate OPC products appear to have been largely focused on proportional draw dies to effect axisymmetric deformation and streamlined flow. While proportional draw dies may be effective for simple symmetric profiles such as tubes and rods, they may not be adequate for producing dimensionally accurate complex asymmetric OPC profiles. Accordingly, there is still a need for an improved draw die and related process for producing complex asymmetric OPC profiles.

SUMMARY

One embodiment of the disclosure relates to a solid state draw die that can produce oriented, dimensionally accurate, symmetric or asymmetric polymer composite profiles. Advantageously, the draw die does not require an axisymmetric deformation of the solid state polymer composition or a proportional deformation throughout the die. In certain embodiments, the solid state draw die is configured with a die inlet and a die outlet wherein the aspect ratio (ratio of width to length) of the die inlet is different, preferably less than, the aspect ratio of the die outlet.

In an embodiment, the die simultaneously achieves asymmetric, non-proportional deformation of the polymer composition to achieve a dimensionally accurate and stable oriented polymer composite article. In one implementation, the aspect ratio of the die inlet is different from the aspect ratio of the die outlet, preferably the two aspect ratios deviate by at least 5%. The difference in aspect ratios provides certain advantages such as substantially preventing the natural flattening of the final profile. In another implementation, the dimensions of the die outlet are preferably linked to the dimensions of the final product profile by a fixed ratio. In an embodiment, the width of the die outlet is about 1.6 times the width of the final product profile and the height of the die outlet is selected so that the aspect ratio of the outlet is slightly less than the aspect ratio of the product profile.

Moreover, one embodiment of the disclosure advances the art of solid state die drawing by providing a method and system for asymmetric, non-proportional solid state die drawing of oriented polymer composite articles having circular or non-circular cross sections and other complex shapes.

An embodiment of the disclosure, is a solid state draw die for drawing an oriented polymer composition comprising:
   a non-proportional adjustable tapered draw die for drawing symmetric or asymmetric oriented composite profiles
   wherein, the non-proportional tapered draw die has a die inlet which is connected to the die outlet by a convergence angle of 5 to 20°, preferably 7 to 18° and more preferably 10 to 15° in the primary dimension such as the width.
   wherein, the aspect ratio of the die inlet is less than the aspect ratio of the inlet profile and the aspect ratio of the die outlet is less than the aspect ratio of the outlet profile which prevents the natural flattening of the profile during the drawing process.
   wherein the draw die is heated to 10 to 50° F. of the melting point of the polymer during the drawing process,
   wherein, the non-proportional draw die induces an unbalanced polymer flow, preferably with a nominal draw ratio of four or more, which results in a non-proportional deformation of the polymer composition;
   creating an oriented, dimensionally accurate symmetric or asymmetric polymer composite profiles,
   wherein, the oriented polymer composite has a density of about 0.3 to 0.9 g/cc, and has a coefficient of linear expansion of $25 \times 10^{-6}$ in/in/° F. or less. Preferably, the polymer composite has low weight, increased stiffness and strength.

In an embodiment of the disclosure is a solid state draw die for drawing an oriented polymer composition, comprising,
   a non-proportional adjustable tapered draw die for drawing symmetric or asymmetric oriented composite profiles
   wherein, the non-proportional draw die accommodates an unbalanced polymer flow, preferably with a nominal draw ratio of four or more;
   which results in a non-proportional deformation of the polymer composition;
   to form a symmetric or asymmetric oriented polymer composite with sharp edge definition.

In one embodiment, the disclosure involves the process of orienting a polymer material containing multiple phases in the solid state. This is accomplished by stretching the material in the solid state. In addition to the formation of an oriented polymer structure, internal voids are also formed in the material during the stretching, thus reducing its density.

In an embodiment, a method is provided for producing an oriented polymer composite article. The method comprises the steps: combining an extruded polymer with one or more fillers to form a starting material, heating and extruding the starting material through a solid state extrusion process into a first column, sending the first column through a non-proportional, adjustable, tapered stretching die. This results in a non-proportional deformation of the oriented polymer composition. Thereafter, causing the first column to exit the non-proportional stretching draw die into a second column having a cross-sectional area less than that of the first column wherein a back tension force is applied on the first column before the first column enters the stretching draw die; and applying a pulling force to the second column to stretch the first column through the non-proportional adjustable draw die at a rate sufficient to cause orientation of the polymer and to cause the second column to diminish in density to form the composite material.

In an embodiment, an oriented symmetric or asymmetric polymer composite article is drawn from a non-proportional adjustable, tapered draw die, wherein the non-proportional draw die accommodates an unbalanced polymer flow of the orientable polymer composition, with a nominal draw ratio of four or more, which results in a non-proportional deformation of the oriented polymer composition; wherein, the non-proportional tapered stretch die has a die inlet which is connected to the die outlet by a convergence angle of 5 to 20°, preferably 7 to 18° and more preferably 10 to 15° in the primary dimension such as the width, wherein the aspect ratio of the die inlet is less than the inlet profile and the aspect ratio of the die outlet is less than the outlet profile; which prevents the natural flattening of the profile during the drawing process; wherein the non-proportional draw die has the inlet profile that has rounded edges and the exit profile that has sharp edges thereby creating an oriented, dimensionally accurate symmetric or asymmetric polymer composite profiles wherein, the oriented composite article has a density of 0.3 to 0.9 g/cc and a coefficient of linear expansion of $25 \times 10^{-6}$ in/in/° F. or less. The oriented composite article has low weight, increased stiffness and strength.

DETAILED DESCRIPTION

Embodiments of the present disclosure provide systems and methods for forming oriented polymer composite (OPC) articles using novel modular drawing dies configured to draw complex symmetric and asymmetric profiles.

Figure 1:
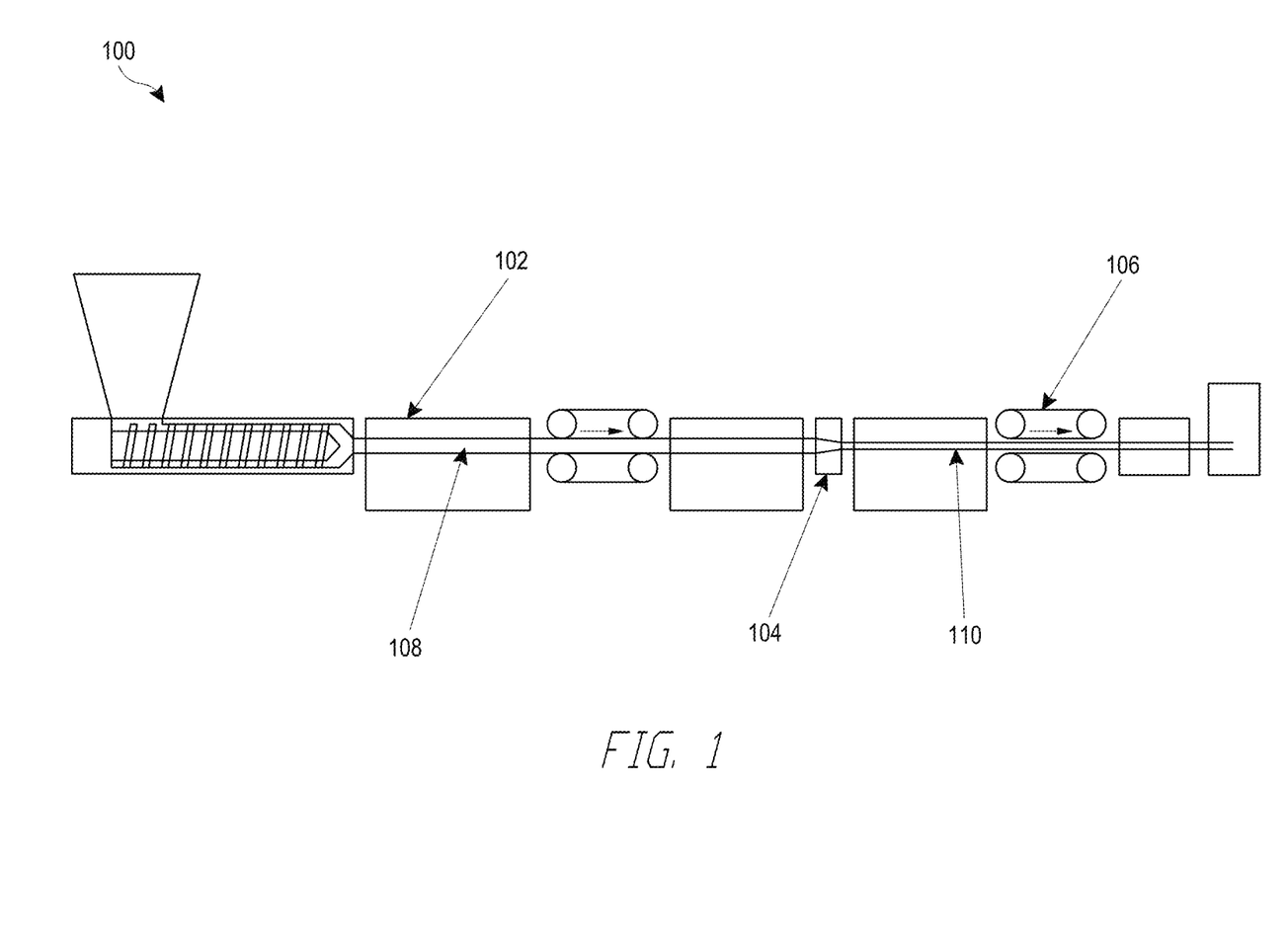
FIG. 1 illustrates a system according to an embodiment for forming an OPC article having complex symmetric and asymmetric profiles.

FIG. 1 is a general schematic illustration of a system 100 according to an embodiment for forming an oriented polymer composite (OPC) article having complex symmetric and asymmetric profiles using an embodiment of the disclosed drawing die. The system 100 generally comprises an extruder 102, a draw die 104 disposed downstream from the extruder 102, and a draw puller 106 configured to pull a polymer composition through the draw die 104. The extruder 102 can be a single, co-rotating twin, counter rotating, twin screw or the like, and configured to extrude an orientable polymer composition into an unoriented initial part 108. The initial part 108 can then be drawn through the draw die 104 to form a final oriented polymer 110 having a reduced cross-sectional area and desired profile imparted by the draw die 104.

Non-Proportional Draw Die

Figure 2:
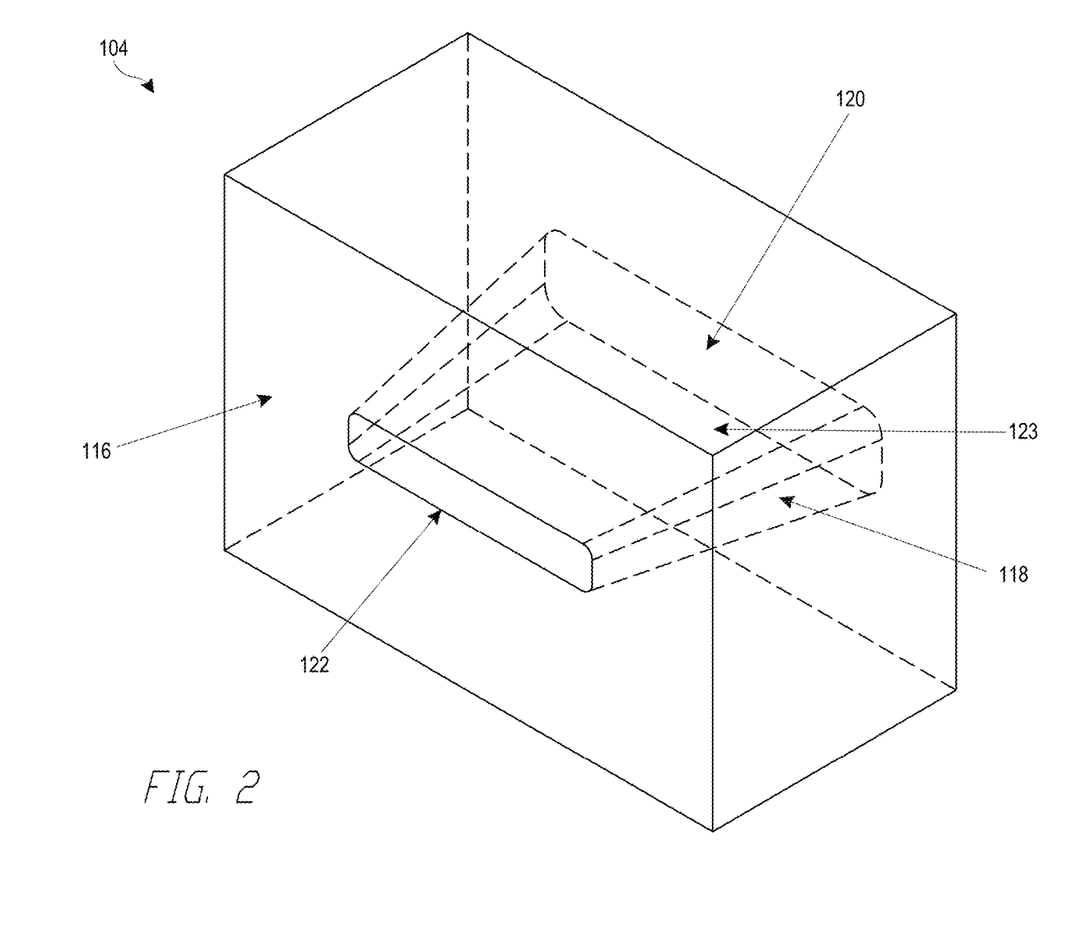
FIG. 2 illustrates a non-proportional draw die according to an embodiment configured to form a complex asymmetric OPC profile.

FIG. 2 is a schematic illustration of an example of the draw die 104 which is configured to form a complex asymmetric OPC profile. In some embodiments, the die 104 can maintain a non-proportional polymer cross section between ends of the die 104, in addition to changing the draw rate. As shown in FIG. 2, the draw die 104 can comprise a die body 116 with a die inlet 120 where the OPC is drawn in, a die outlet 122 where the OPC exits the die 104, and a die channel 123 extending therebetween for the OPC to be drawn through. The die body 116 can be produced in any dimensional specifications and the specifications are not limiting. The die body 116 can be constructed of a metal such as, for example, stainless steel, aluminum or other suitable material. The die 104 can be configured with the desired cross-section profile 118 in the channel 123 for the OPC article to be drawn through the die 104. The die 104 can also comprise a cross-sectional area of the die inlet 120 and die outlet 122. The cross-sectional area of the die inlet 120 can be greater than the cross-sectional area of the die outlet 122 such that polymer compositions converge while being drawn through the die 104. This convergence can help orient a polymer through the die 104. The die inlet 120 and die outlet 122 can have cross sections of any shape including, circles, squares, or more complex shapes. The cross sections of the inlet 120 and the outlet 122 can be different shapes. The shape and size of the cross sections of the inlet 120 and outlet 122 are not limiting.

The convergence angle between the die inlet 120 and the die outlet 122, the slope at which the profile tapers and the slope of the path 123, can be, for example, 5, 6, 7, 8, 9, 10, 11, 12, 13, 14, 15, 16, 17, 18, 19, of 20° in a primary direction, such as, for example, width or height. However, the convergence angle is not limiting.

As mentioned above, the draw die 104 can provide constraints for the polymer composition and can define a drawing path 123 between the inlet 120 and the outlet 122 by directing the polymer composition along the drawing path 123 while orienting the polymer composition. The drawing path 123 can, for example, be smooth and straight or curved. The configuration of the drawing path 123 is not limiting. Similar to the inlet 120 and outlet 122 cross sections, the cross section 118 in the drawing path 123 can have circular or non-circular cross sections. The cross section can comprise multiple sides, for example, one, two, three, four, or more sides. The shape of the cross section 118 can be of any desirable shape including, for example, ellipse, triangle, square, arch or key hole. The shape of the cross section 118 is not limiting. In some embodiments, the cross section 118 of the drawing path 123 can be similarly shaped to the cross sections of the inlet 120 and outlet 122.

In some embodiments, the non-proportional draw die 104 can reduce or expand in cross sectional area 118 from the entrance opening 120 to the exit opening 122. Such an embodiment constitutes a non-proportional tapering drawing die 104. Other embodiments can comprise a tapering draw die 104 with a land section on the exit opening end 122. In these embodiments, the cross section 118 of the tapered die 104 can reduce in cross sectional area from the entrance opening 120 to a certain point prior to the exit opening 122 and then can remain essentially constant from that certain point until the exit opening 122. Other configures of landing or entrance portions can be used and are not limiting.

In some embodiments, the drawing path 123 can extend from the entrance opening 120 to the exit opening 122 of the substantially non-proportional draw die 104 to accommodate an unbalanced polymer flow. The modular draw die 104 at the entrance or inlet opening 120 can have rounded edges and can have sharp edges at the exit opening 122, which facilitates creation of an oriented, dimensionally accurate, symmetric or non-symmetric polymer composite profile.

The exit opening 122 may be substantially non-proportional in shape and size to any cross section 118 of a die's polymer composition drawing path 123 and, hence, the cross section of a final oriented polymer article drawn through the die 104. In one embodiment, the die entrance or inlet opening 120 can have rounded edges and the exit opening 122 can have sharp edges.

Figure 3:
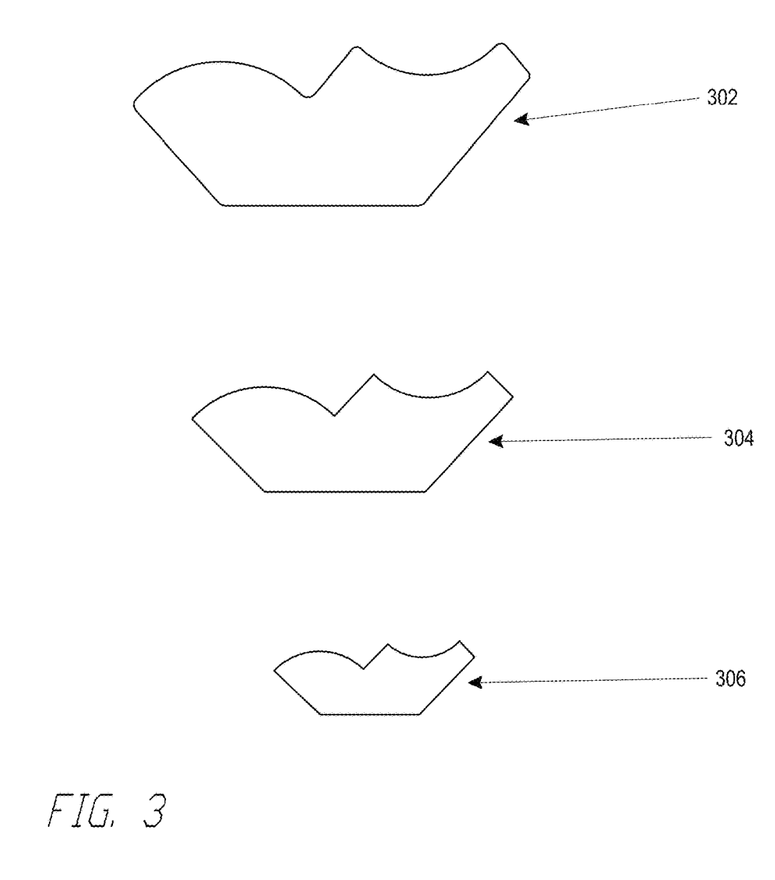
FIG. 3 illustrates the geometries of cross-sections of the draw die inlet and the draw die outlet of a non-proportional, modular draw die according to an embodiment and the final part having a bed mould profile made with the draw die.

FIGS. 3-8 illustrate embodiments of the die with different cross sections. FIG. 3 illustrates an embodiment of a die with a bed moulding profile. The entry 302 of this embodiment can have a 2.00X width, a 2.30X height (2.15X eff. in both directions), a 2.40 aspect ratio, and a 1/16" fillet radius. In some embodiments, the entry 302 can flare out. The entry 302 can be, for example 3.262" in width and 1.355" in height. The exit 304 of this embodiment can have a 1.60X width, a 1.65X height, and a 2.69 aspect ratio. The exit 304 can be, for example, 2.610" in width and 0.972" in height. The exit 304 can also have sharp edges. The final part 306 formed from this embodiment can have an aspect ratio of 2.77. The part 306 can be, for example, 1.628" in width and 0.589" in height.

Figure 4:
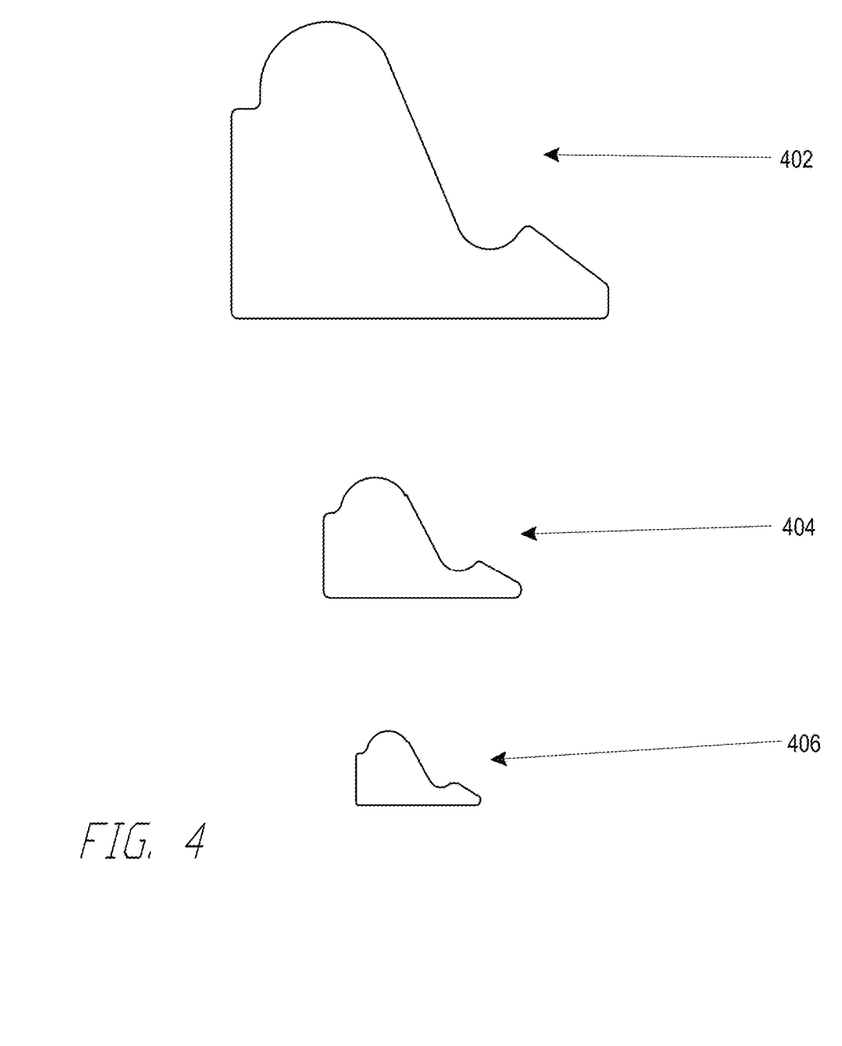
FIG. 4 illustrates the geometries of cross-sections of the draw die inlet and the draw die outlet of a non-proportional, modular draw die according to an embodiment and the final part having a base cap profile made with the draw die.

FIG. 4 illustrates an embodiment with a base cap profile. The entry 402 of this embodiment can have a 3.03X width, a 4.01X height (2.15X eff. in both directions), a 1.44 aspect ratio, and a 1/16" fillet radius. In some embodiments, the entry 402 can flare out and the entry 402 can comprise radius surface transitions. The entry 402 can be, for example 3.409" in width and 2.688" in height. The exit 404 of this embodiment can have a 1.60X width, a 1.65X height, and a 1.62 aspect ratio. The exit 404 can have a 0.05" fillet radius and a 3.0" draw die length. The exit 404 can be, for example, 1.800" in width and 1.111" in height. The final part 406 formed from this embodiment can have an aspect ratio of 1.67. The part 406 can be, for example, 1.125" in width and 0.674" in height.

Figure 5:
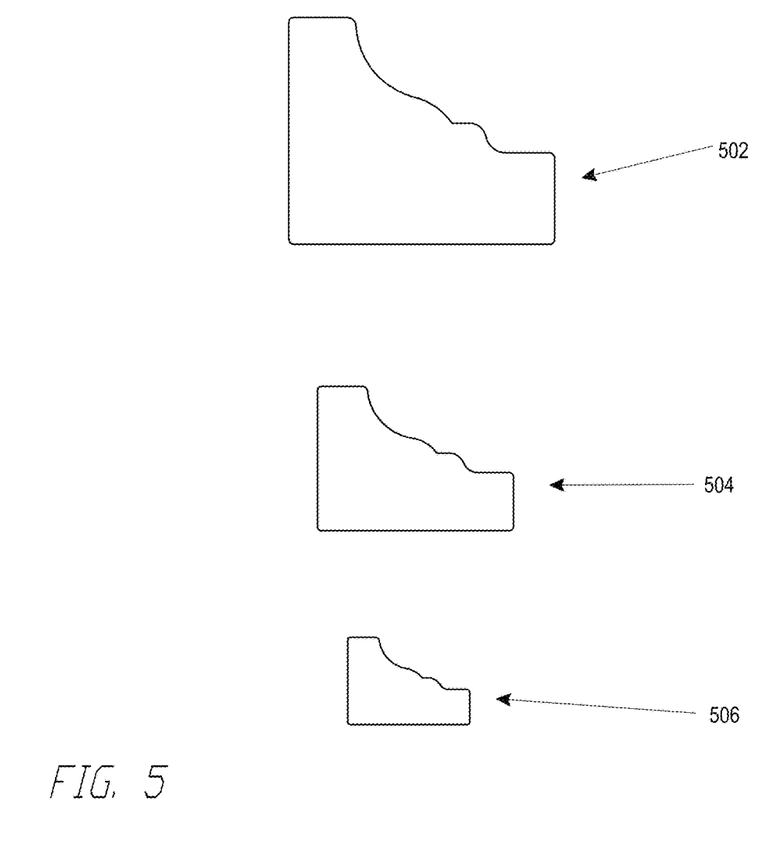
FIG. 5 illustrates the geometries of cross-sections of the draw die inlet and the draw die outlet of a non-proportional, modular draw die according to an embodiment and the final part having a rams crown profile made with the draw die.

FIG. 5 illustrates an embodiment with a rams crown profile. The entry 502 of this embodiment can have a 2.18X width, a 2.60X height, a 1.17 aspect ratio, and a 1/16" fillet radius. In some embodiments, the entry 502 can flare out and the entry 502 can comprise radius surface transitions. The entry 502 can be, for example 4.360" in width and 3.705" in height. The exit 504 of this embodiment can have a 1.60X width, a 1.65X height, and a 1.36 aspect ratio. The exit 504 can have a 0.05" fillet radius and a 2.5" draw die length. The exit 504 can be, for example, 3.200" in width and 2.351" in height. The final part 506 formed from this embodiment can have an aspect ratio of 1.40. The part 506 can be, for example, 2.000" in width and 1.425" in height.

Figure 6:
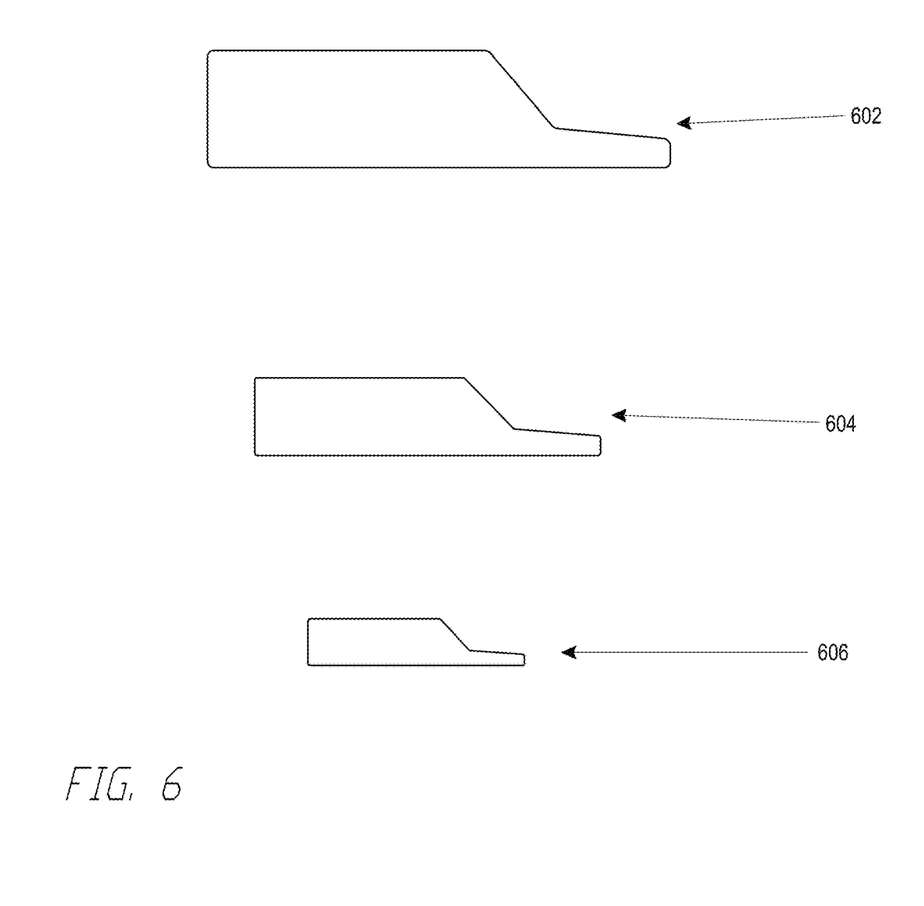
FIG. 6 illustrates the geometries of cross-sections of the draw die inlet and the draw die outlet of a non-proportional, modular draw die according to an embodiment and the final part having a skirt board profile made with the draw die.

FIG. 6 illustrates an embodiment with a skirt board profile. The skirt board can be, for example, a 1×4 skirt board. The entry 602 of this embodiment can have a 2.14X width, a 2.54X height, a 3.93 aspect ratio, and a 1/16" fillet radius. In some embodiments, the entry 602 can flare out or round off sharp, and the entry 602 can comprise radius surface transitions. The entry 602 can be, for example 7.490" in width and 1.823" in height. The exit 604 of this embodiment can have a 1.60X width, a 1.65X height, and a 4.53 aspect ratio. The exit 604 can have a 0.05" fillet radius and a 3.5" draw die length. The exit 604 can be, for example, 5.600" in width and 1.238" in height. The final part 606 formed from this embodiment can have an aspect ratio of 4.67. The part 606 can be, for example, 3.500" in width and 0.750" in height.

Figure 7:
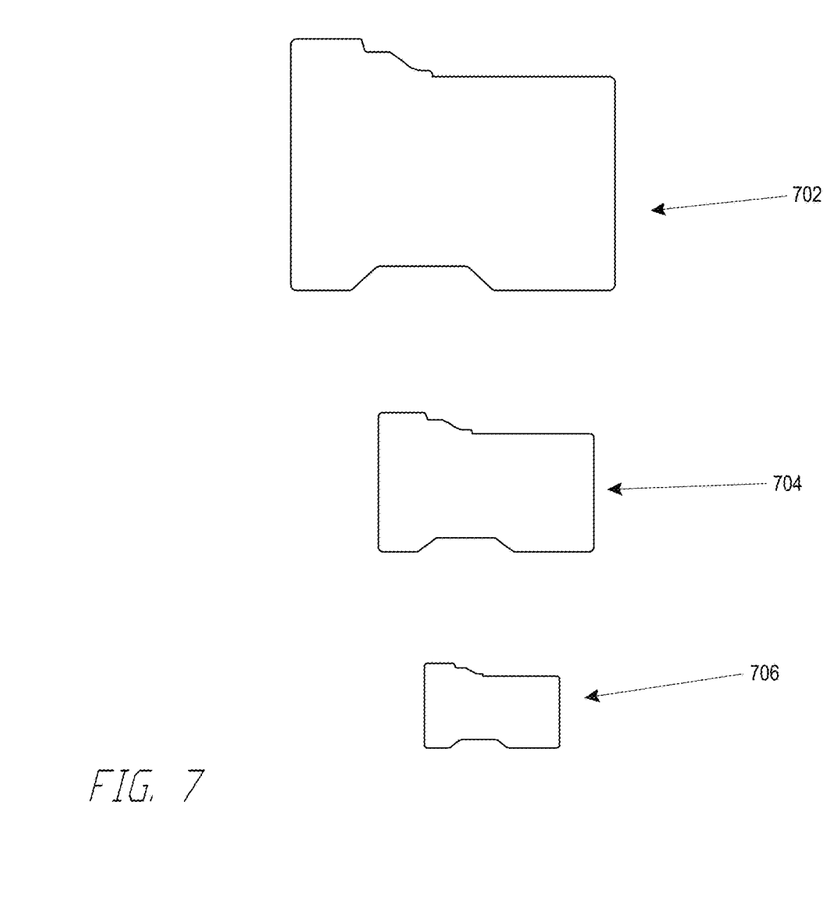
FIG. 7 illustrates the geometries of cross-sections of the draw die inlet and the draw die outlet of a non-proportional, modular draw die according to an embodiment and the final part having a brick mould profile made with the draw die.

FIG. 7 illustrates an embodiment with a brick mould profile. The entry 702 of this embodiment can have a 2.40X width, a 2.98X height, a 1.29 aspect ratio, and a 1/16" fillet radius. In some embodiments, the entry 702 can flare out and the entry 702 can comprise radius surface transitions. The entry 702 can be, for example 4.800" in width and 3.725" in height. The exit 704 of this embodiment can have a 1.60X width, a 1.65X height, and a 1.55 aspect ratio. The exit 704 can have a 0.05" fillet radius and a 2.5" draw die length. The exit 704 can be, for example, 3.200" in width and 2.063" in height. The final 706 part formed from this embodiment can have an aspect ratio of 1.60. The part 706 can be, for example, 2.000" in width and 1.250" in height.

Figure 8:
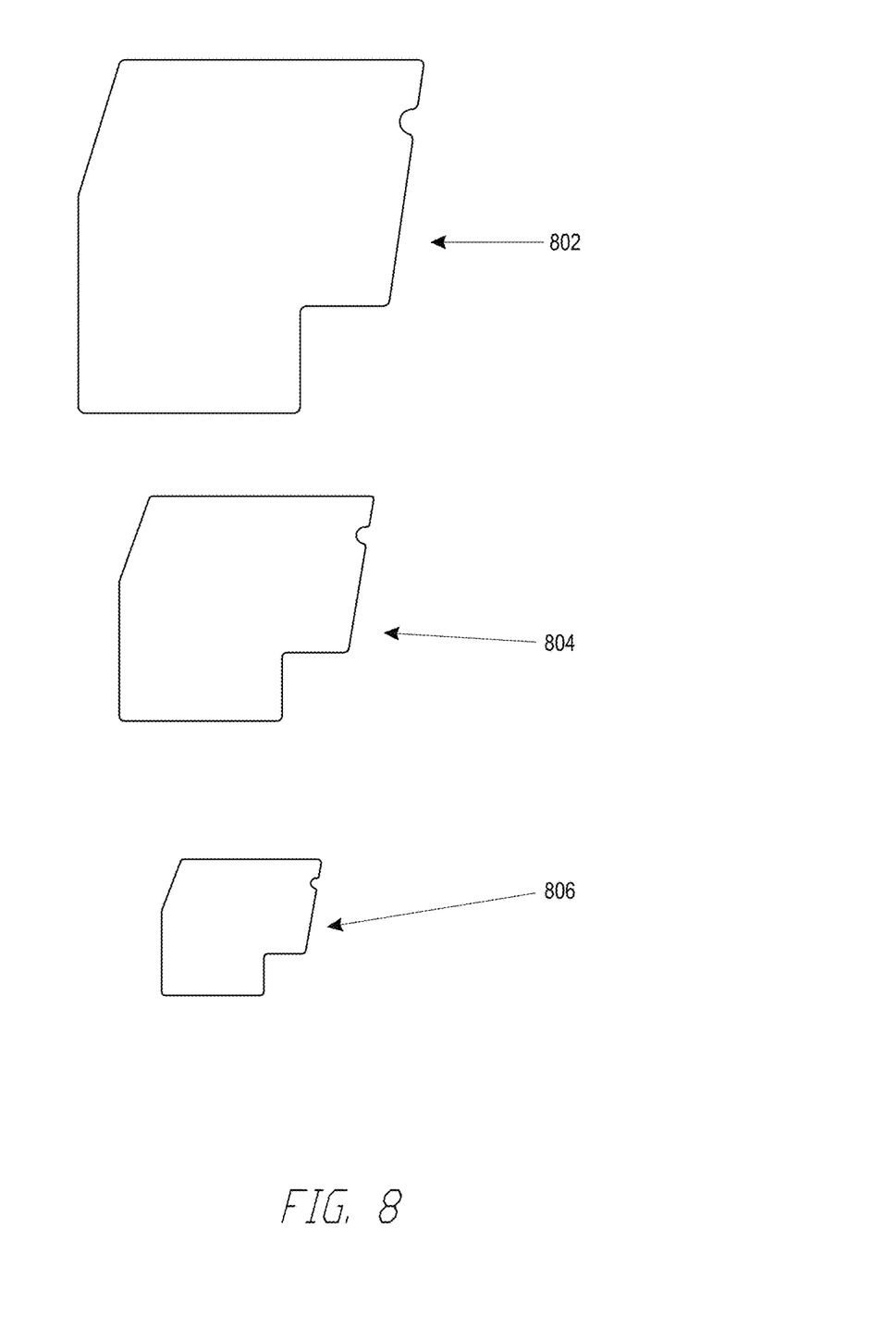
FIG. 8 illustrates geometries of cross-sections of the draw die inlet and the draw die outlet of a non-proportional, modular draw die according to an embodiment and the final part having a historic sill profile made with the draw die.

FIG. 8 illustrates an embodiment with a historic sill profile. The entry 802 of this embodiment can have a 2.17X width, a 2.60X height, a 0.98 aspect ratio, and a 1/16" fillet radius. In some embodiments, the entry 802 can flare out and the entry 802 can comprise radius surface transitions. The entry 802 can be, for example 4.449" in width and 4.550" in height. The exit 804 of this embodiment can have a 1.60X width, a 1.65X height, and a 1.14 aspect ratio. The exit 804 can have a 0.05" fillet radius and a 2.5" draw die length. The exit 804 can be, for example, 3.220" in width and 2.888" in height. The final part 806 formed from this embodiment can have an aspect ratio of 1.17. The part 806 can be, for example, 2.044" in width and 1.750" in height.

The above described dimensions and ratios are illustrative and are not limiting.

In some embodiments, the die 104 can have gaps within the die 104. These gaps can be, for example, grooves, holes, spaces, or notches. The type of gap is not limiting. The gap can extend the length of the die 104 or can have a length shorter than the length of the die 104. In some embodiments, the gaps within the die 104 can be filled with lubricants or other desirable materials.

In some embodiments, the non-proportional tapered draw die 104 can have elements residing in the draw die 104 which may serve to create hollow oriented polymer composite articles.

In some embodiments, an insert may be used with the die 104. An insert is separate from the die 104, but can be inserted into the die 104. The inserts may, for example, be inserted into the inlet 120 or outlet 130. The inserts may be inserted into the die 104 at other locations as well. Inserts can be a similar, or different, composition than the material of the die 104. The composition of the insert can be, for example, a ceramic or polymer, but the composition is not limiting. The inserts can be removed and replaced after use in the die 104, thereby potentially protecting the die 104 from harsh conditions. In other embodiments, a coating can be used in a similar manner as the inserts.

In certain embodiments, the die body 104 may be formed from one piece or may comprise multiple pieces. The multiple pieces can be connected through, for example, welding, gluing, etc. The connecting is non-limiting. The multiple pieces can be interchanged with other pieces to modify, for example, the entrance and exit openings, thereby allowing for modification of the die 104. In some embodiments, attachments can be connected to either the entrance or exit openings in order to modify the size and/or shape of the entrance 120 and exiting openings 122. The attachments can be attached during the drawing process to modify the shape of the drawn polymer.

The draw die 104 may also include heating and cooling elements, and access openings for addition of lubricants and other process aids. For example, the die 104 can be heated to about 10 to 50° F. of the melting point of a polymer composition.

The non-proportional draw die 104 can take many forms that retain the primary purpose of increasing the force on the extrudate in order to contribute to the forces required to accomplish the orientation process.

Dimensions

As mentioned above, unlike proportional dies, the draw die according to embodiments of the present disclosure can have one or more non-proportional cross-sections such that the ratio of cross-sectional dimensions 118 may not be the same throughout the die draw channel 123. For example, in some embodiments, the width to length ratio of the die inlet 120 can deviate from the width to length of the die outlet 122 by at least 5%, 10%, 15%, 20% or 30%. Using a non-proportional die 104 to form OPC shaped articles is contrary to conventional wisdom which suggests that a proportional die is required to form an OPC article with accurate dimensions.

In some embodiments, the outlet 122 can be linked to the final profile dimensions of a polymer composition by a fixed ratio. The width of the outlet 122 can be, for example, 1.0, 1.1, 1.2, 1.3, 1.4, 1.5, 1.6, 1.7, 1.8, 1.9, or 2.0 times the polymer profile width and the height dimension can be selected so that the aspect ratio of the outlet 122 is slightly less than that of the polymer. However the ratio is not limiting. This can account for the "flattening" of the profile during the drawing process. The aspect ratio of the inlet 120 can also be smaller to account for the natural "flattening" during the drawing process.

In some embodiments, there can occur a non-proportional deformation of the oriented polymer composition as it draws down through the non-proportional tapered draw die 104.

In some embodiments, the aspect ratio, defined as the ratio of the width dimension to the height dimension, can be different between the die inlet 120 and the die outlet 122. In some embodiments, the aspect ratio, of the die inlet 120 can be less than the aspect ratio of the inlet profile and the aspect ratio of the die outlet 122 can be less than the aspect ratio of the outlet profile. Advantageously, this configuration can inhibit the natural flattening of the profile during the drawing process. In other embodiments, the nominal draw ratio may not be equal to the cross sectional area of the polymer composition entering the die 104 to the cross sectional area of the exit opening 122.

The disclosed die can produce superior edge definition and good surface quality. The die can produce polymers with market-acceptable edge quality in complicated profiles with multiple edges and smooth surfaces.

Polymer Orientation

For a given initial extrudate geometry, non-proportional draw die's geometry and process conditions, a certain final oriented part geometry 110 can result when the initial extrudate 108 is pulled through the draw die 104. If the extrudate geometry, extrudate composition or process conditions vary in any way, this can result in a change in the final oriented part geometry, as the force required by the interaction of the die 104 and initial extrudate 108 can vary with the variations in geometry, extrudate composition or other process conditions. If the draw puller 106 is operated at a rate higher than that required to pull the extrudate through the non-proportional draw die 104, the speed the part moves into the draw die 104 can increase to a level higher than the extrudate speed at the exit of the extrusion speed control. This can place the part in the temperature conditioning area into a state of "back" tension, stretching it very slightly. This tension force can be added to the force required to pull the part through the die 104, resulting in an increase in the total force on the part at the draw die exit 122 and increased stretching.

Some of the stretching force comes from the interaction of the initial extrudate 108 with the draw die 104 or the stretching die. The outlet of the non-proportional draw die 104 can be of a smaller cross sectional area than the cross sectional area of the initial extrudate 108 passing through the draw die 104. To pull the initial extrudate 108 through the restriction of the draw die 104 requires the application of a pulling force. If this is the only source of force on the part at the draw die exit 122, the interaction of the initial extrudate 108 with the draw die 104 can be difficult to control, as there are minor variations in the composition, shape, and temperature conditioning of the initial extrudate 108 as it reaches the draw die 104.

The combination force from the speed difference between the extrusion speed control and the stretching puller 106 with the force to pull the material through the non-proportional draw die 104 can allow the operator to select the overall degree of stretching directly, thereby limiting the effect of the draw die/extrudate interactions in determining the final part geometry 110. Furthermore, a non-proportional draw die 104, with or without a geometry that deviates from the uniform shape of the extrudate, can be used in conjunction with the speed difference between extrusion speed control and the stretching puller 106 to produce a variety of shapes and physical properties.

If the orientation process is substantially started in the temperature conditioning section, the final part shape can be greatly affected by local variations in part temperature conditioning, part shape, and composition. Without an appropriately designed draw die 104, the part can choose to deform anywhere between the extrusion speed control and the stretching puller 106 which can result in uneven final part 110 dimensions. To avoid this, the tension on the part in the temperature conditioning section can be maintained below the yield strength of the part 110, thus avoiding substantial stretching before the draw die 104. By adding enough force at the draw die 104 to cause the bulk of the stretching, a small volume of material may be undergoing orientation at any one time. Thus, all of the material may undergo a similar amount of orientation and achieve a similar size and the process is less susceptible to minor variations in the initial part size 108, material composition, or local process conditions.

The amount of force generated at the non-proportional draw die 104 can initiate orientation, while the force on the part 110 in the temperature conditioning section can be preferably less than that required to initiate orientation before the extrudate reaches the draw die 104. This is achieved by a balance between the level of restriction at the draw die 104 and the difference between the speeds of the extrusion speed control and the stretching puller 106.

Solid State, Non-Proportional Die Drawing Process

In some embodiments, a method is disclosed for producing an oriented composite material. The method can include the steps of combining an extrudable polymer with one or more fillers wherein each filler is in solid, liquid, or gas form, to form a starting material; heating and extruding the starting material into a first column; adjusting the temperature of the first column to a stretching temperature; presenting the first column to a stretching non-proportional draw die and causing the first column to exit the draw die in a second column having a cross-sectional area less than that of the first column; and applying a pulling force to the second column to stretch the first column through the draw die at a rate sufficient to cause orientation of the polymer and to cause the second column to diminish in density to form the composite material.

In some embodiments, the method can comprise the further step of applying a back tension force to the first column before the first column enters the stretching draw die.

In some embodiments, the process can utilize thermal conditioning of the polymer composition prior to drawing it through a solid state drawing die by bringing the polymer composition to a drawing temperature ($T_d$) within a drawing temperature range that is between the softening temperature ($T_s$) and about 50° C. below $T_s$ of the polymer composition and then initiate drawing of the polymer composition while the polymer composition remains within the drawing temperature range.

In some embodiments, the polymer composition can be conditioned to a drawing temperature of at least about 5 degree Celsius (° C.), preferably at least about 10° C. below its $T_s$. The drawing temperature range can extend to about 20° C. or more, even about 30° C. or more below the polymer composition $T_s$. Orientation will not occur to any significant extent if the drawing temperature is above the $T_s$ of the orientable polymer composition. On the other hand, slow draw rates are necessary if the drawing temperature is too low due to a risk of fracturing the polymer composition during drawing. Generally, the drawing temperature can be preferably about 40° C. or less below the polymer composition's $T_s$ to avoid fracturing the polymer composition.

After conditioning the polymer composition to a drawing temperature, the polymer composition can be drawn through a non-proportional tapered drawing die.

Extrusion rates for the composite material will vary depending on various factors such as the particular composite material selected, the degree of reduction, and the cross-sectional area of the extruded strip or column. Extrusion rates are however rather slow and rates on the order of six inches per minute (6 in./min.) are not atypical. It has been found that rather than extruding the composite material by pressing it through the die, the composite material may be drawn through the die.

In an embodiment, one manner of drawing the composite material through the die can be to initially commence by extrusion, as discussed above. Once an end of the oriented product begins to emerge from the die, the end may be grasped, such as by a clamp and pulled. The pulling would typically be done with no further pressing force being applied and yields an oriented end product. In tests, pulling rates of up to about 14 ft/min. (fourteen feet per minute) have been achieved which was limited by machine capacity. Pulling rates of about 20 ft/min. (twenty feet per minute) may be achieved.

The polymer composition can be drawn through the solid state non-proportional tapered drawing die to orient the polymer composition through the die. The polymer can be drawn at about 25.4 centimeters (10 inches) per minute, preferably greater than about 127 centimeters (fifty inches) per minute, preferably greater than about 254 centimeters (100 inches) per minute. Drawing the polymer composition at increased rates can provide higher efficiency in producing the polymer. This increased rate can also add useful stresses to the polymer composition to achieve specific orientations. Typically, the draw rate can be about 30.5 meters (1200 inches) per minute or less, more typically about 9 meters (360 inches) per minute or less.

Cooling After Drawing

Some distance after passing through the stretching die, the part can be cooled to help preserve the orientation induced during stretching and to cool the part for subsequent handling because, at its stretching temperature, the part is quite flexible and prone to warping during handling. The time and temperature of cooling can depend on the final part shape and the desired final temperature for ease of handling for a specific material composition.

In some embodiments, the method comprises the further step of cooling the surface of the part.

In some embodiments, the method comprises the further step of smoothing the surface of the part.

In some embodiments, the method comprises the further step of cooling and smoothing the surface simultaneously.

Stretching Puller

The stretching puller can be provided with a sufficient force capability to stretch the part. This depends on various factors, such as, the composition, operating conditions, degree of stretching and size of the part. Commonly available machines in the industry are adequate for this purpose. They include but are not limited to: godet stands for parts that are flexible enough to pass through, cleated pullers, belted pullers, wheel pullers and reciprocating pullers.

Surface Toughening

Various methods can be used to provide a toughened surface in order to increase the abrasion resistance and workability and surface properties of the product. The existence of molecular orientation in the product may render it susceptible to "splitting" due to the low transverse strength that is a result of orientation. This effect is most detrimental at the surface of the product where it is exposed to the forces of abrasion as well as when it is exposed to high levels of force from cutting tools. The main goal of surface toughening is to provide a surface where the "splitting" tendency of the oriented material is eliminated.

In some embodiments, an unoriented polymer surface can be provided by melting. In certain implementations, an oriented polymer composite material having at least one such unoriented polymer surface that is about 150 microns thick and provided by melting is formed in accordance with the compositions and methods described in US Publication No. 20090001635. In some embodiments, a coating of unoriented polymer can be placed on the surface after orientation. In some embodiments, the surface can be coated with a thermosetting polymer such as polyurethane or other coating.

The orientation can be substantially eliminated, thus improving surface durability by heating the surface above its melting point, thereby allowing the molecules to relax and returning them to their unoriented state which has isotropic properties and is not susceptible to the transverse splitting of the oriented state. This can be accomplished with heated plates, heated rollers, or indirect heating such as hot air or infra-red radiation, among other methods. Upon re-melting, the material may become rough due to retractive forces resulting from the previously oriented state. This roughened surface can be smoothed by the application of force through a roller which has the added benefit of densifying the formerly low density material that is now melted.

Another method of increasing the surface durability is by applying a coating of material to protect the surface from the forces that could cause transverse splitting. This coating can be the same composition as the substrate material or be substantially different depending on specific properties that are desired in the surface such as the addition of color, and additives for ultraviolet (UV) radiation resistance. This surface can be applied by extrusion coating similar to, for example, coating a wire with an insulating sheath, or, for example, when a film of coating is applied to paper. Other methods of obtaining this durable surface include curtain coating, vacuum coating, spraying, or the like, using materials like thermosetting resins such as polyurethanes, epoxies, or polyesters or air drying formulations commonly referred to as paints.

Depending on the method, surface toughening may be applied at other positions or in an offline process after the goods are cut.

Surface treatment can also be applied to the polymer billet such as adding a protective coating, such as for instance, polyurethane to protect the surface layer from scratching.

In some embodiments, the increased toughness can be provided by heating of the surface performed by a non-contact heating method.

In some embodiments, the non-contact heating method can be selected from the group consisting of hot air, infra-red radiation, and direct flame heating.

In some embodiments, the increased toughness can be provided by heating of the surface performed by a contact heating method.

In some embodiments, the contact heating method can be selected from the group consisting of heated plates, moving belts or rotating cylinders.

In some embodiments, the increased toughness on the surface of the composite material can be provided by heating the surface to lower the degree of the orientation of the polymer at the surface of the composite material.

In some embodiments, the surface of the composite material can be covered with a second material that is of higher durability than the composite material.

Cutting

After exiting the puller, a traveling saw of the type common in the industry can be used to cut the part to length while it is moving.

Embossing

In some embodiments, desired patterns may be incorporated in the composite sheets using suitable techniques, for example, using a plate press, using a profiled accumulator roll, by post-cure machining, or by embossing. The embossing method involves a press cycle, which may be single, dual or the like and is applied to the cement boards to impress one or more different patterns on the board. The embossed pattern may possibly be used for functional or aesthetic purposes.

Optionally, in other embodiments, the process for making the oriented polymer composition may include steps such as those disclosed in Patent No. U.S. Pat. No. 6,939,496, and Publication No. US 2009/0001635 and US 2009/0001625 which are hereby incorporated by reference in their entirety.

Oriented Polymer composition

In various embodiments, the orientable polymer compositions formulated to be drawn through non-proportional draw dies of the present disclosure may include one or more orientable polymers, fillers, and various additives.

Polymer

The orientable polymers can be amorphous or semi-crystalline. Semi-crystalline polymers have a melt temperature and include those polymers known as crystalline. In some embodiments, orientable polymers include semi-crystalline polymers, even more preferable are linear polymers such as polymers for which chain branching occurs in less than 1 of 1,000 polymer units. Semi-crystalline polymers can result in greater increase in strength and modulus than amorphous polymer compositions. In some embodiments, semi-crystalline polymer compositions can result in about 4-10 times greater increase in strength and modulus upon orientation over amorphous polymer compositions Numerous polymer compositions can be drawn through the disclosed die. For example: Polyethylene, Polypropylene, Polyvinylchloride, Polylacticacid, the members of the Nylon family, Polyoxymethylene, Polyethylene terephthalate, Polybutelene terephthalate, Polyethyletherketone, liquid crystal polyesters and the like. For example: Polyethylene, Polypropylene, Polyvinylchloride, Polylacticacid, the members of the Nylon family, Polyoxymethylene, Polyethylene terephthalate, Polybutelene terephthalate, Polyethyletherketone, liquid crystal polyesters and the like. The type of polymer used in the disclosed die is not limiting and one skilled in the art would be able to select an appropriate polymer for the final product.

In some embodiments, the polymer is present in an amount of from 100 to 20 percent by weight in the starting material. In some embodiments, the polymer is present in an amount of from 95 to 20 percent by weight in the starting material.

In addition, one or more resins can also be used. If the resins form a single phase when mixed, this single phase mixture forms the continuous matrix phase. If the resins are not miscible in one another when mixed, but each form continuous phases, they each form a matrix phase.

Matrix phase is a continuous material that surrounds any other phases present. That is to say that any point in the matrix phase is connected to all other points in the matrix phase by the matrix material, the continuous phase in not made up of individual domains but a continuous material that is throughout the entire part. This includes situations where there are two or more continuous phases, so called "interpenetrating networks" of more than one phase where both phases are continuous but do not dissolve in one another.

Filler

Fillers can be included in the orientable polymer compositions of various embodiments for enhancing the physical properties of the composite article. In some embodiments, a binding agent can be mixed with the fillers to provide a predetermined dispersing pattern of the fillers in the composite material during solid state extrusion of the material through a non-proportional die drawing process of various embodiments. The fillers can comprise organic, inorganic or a combination of organic and inorganic materials. In some embodiments, the fillers can be a combination of organic and inorganic components with the inorganic component comprising 25 wt. % or more, preferably 50 wt. % or more, or preferably 75 wt. % or more of the fillers.

In one embodiment, the one or more fillers can be selected from the group consisting of organic fillers, inorganic fillers, engineered fillers, industrial waste materials. In another embodiment, the filler may be natural or synthetic fiber.

In one embodiment, an oriented composite material can be provided which comprises a particulate material dispensed in an oriented polymer.

Suitable organic fillers may include cellulosic materials such as for instance, wood flour, wood pulp, flax and rice hulls. The organic filler material may be wood sawdust and has a mesh in the range of about 10 to 300, preferably in the range about 10 to 150 and more preferably having a particle size of about 60 mesh.

Suitable inorganic fillers may include mica, talc (including any or a combination of materials and grades commonly known and available as "talc"), chalk, titanium dioxide, clay, alumina, silica, glass beads, wollastonite, calcium carbonate, magnesium sulfate, magnesium hydroxide, barium sulfate, calcium oxysulfate, tin oxide, metal powder, glass powder, pigments, minerals, glass, ceramic, polymeric or carbon reinforcing agent fillers such as glass fibers, micas, talcs, carbon fibers, wollastonite, graphite, silica, magnesium carbonate, alumina, metal fibers, kaolin, silicon carbide, glass flake and the like. Fillers can serve many purposes such as for example, serving to enhance flame retardancy, inducing cavitation during the drawing process, and providing partial reinforcement of an article.

Suitable engineered fillers may include glass microspheres or microballoons, cenospheres, perlite and the like.

Suitable industrial wastes such as for example, fly ash may also be used as fillers in the oriented polymer composition of certain embodiments. In various embodiments, any industrial waste that can be ground or supplied at a sufficient size to be processed in plastic processing equipment and mixed in the matrix polymer can be used as fillers.

In certain embodiments, the fillers can provide reinforcement without forming voids. The interface between the filler phase and the matrix phase preferably has sufficient strength to withstand stresses during stretching. Some filler materials may be naturally compatible with the matrix phase or may require to be coated with a chemical agent to make them compatible and produce an interfacial bond of sufficient strength. Also, a chemical agent may be added to the material to react at the interface of the filler phase and the matrix phase to improve the interfacial strength.

For filler particles that have poor interfacial strength with the matrix, the aspect ratio of the particle is not a major factor because after stretching, the particles will not be attached to the matrix. The aspect ratio may be a factor for particles with interfacial strength that can withstand stretching where increased aspect ratios may be an advantage.

In some embodiments, the fillers can also be a gas. Foaming can be used in the process to form gaseous bubbles in the orientable polymer matrix. The foaming can be of three main types: physical gases generated by physical blowing agents that are injected into the melt during processing; materials such as chemical blowing agents that decompose to form gases during processing; and gas-filled microspheres that expand during processing to reduce density, such as those generally known by the tradename EXPANCEL microspheres. Gaseous bubbles produced by free foaming, the "Celuka" process, or other foam generating process can be applied to reduce the density of the polymer matrix before orientation.

Additives

Additives may be included in the oriented polymer composition to improve performance during extrusion and die drawing processes in addition to improving the performance of the resulting oriented polymer article. In certain embodiments of the present disclosure, various combinations of additives in the form of pigments, colorants, lubricating agents, and the like are contemplated to enhance certain characteristics of the oriented polymer composite material.

The additives may generally include lubricants, such as metallic stearates and ethelyene-bis-steramide, or organic lubricants, as well as colorants or product performance enhancement additives that increase the ultraviolet (UV) stability in service or thermal stability during processing and while in service. Also included are additives to increase the resistance to microbial attack. The additives can also be selected to aid in improving strength, workability, durability and overall performance of the oriented composite product.

Embodiments of the present disclosure can comprise additives that are optionally incorporated into the oriented polymer composition preferably in an amount between about 0.5 to 15 wt. %, more preferably about 1 to 10 wt. % and most preferably about 2 to 5 wt. % of the oriented polymer composition.

Additives may include, but not be limited to, density modifiers, dispersing agents, mineral oxides and hydroxides, metal oxides and hydroxides, clays, silica fume or amorphous silica, geothermal silica, fire retardants, biocides, thickeners, pigments, plasticizers, dispersants, foaming agents, flocculating agents, water-proofing admixtures, water reducing admixtures, setting rate modifiers, shrink compensators, set accelerators, set retarders, gas forming agents, air entraining agents, hardeners, filtering aids, density modifiers, mica, wollastonite, and polymer additives such as polymers and co-polymers of acrylamide and/or methacrylamide, and/or polyester and/or polyvinyl acetate and/or polystyrene for example, and methyl cellulose, polymeric resin emulsions, or mixtures thereof.

Equipment/Process Steps

Material Preparation

The orientable polymer compositions can be prepared in accordance to how they are generally used in the polymer compounding industry. They can be pre-compounded into master batches containing one or more components that are blended and formed into pellets that are further blended with other feed materials prior to extrusion of the material. They can be blended in their raw form and melted/mixed while extruding the final material or various combinations thereof. Raw materials containing components that become undesirable gases during processing, such as water, are generally dried before processing.

Extrusion

Extruders, such as single, co-rotating twin, counter rotating twin, or the like, can be used to melt and mix the raw materials of the orientable polymer composition. The melted and mixed materials can be pumped through a die that continuously forms the initial unoriented extruded part of the polymer composition. At this stage, a continuous part of a prescribed shape that is sufficiently well mixed is formed. While poor mixing may affect the final part, mixing quality beyond that typically seen in extrusion may not be required. The extruded part may have a reduced density compared to the starting components if physical or chemical blowing agents or expanding microballoons are used during initial unoriented part extrusion. The initial unoriented extruded part may contain the orientable thermoplastic resin and one or more fillers, as described above.

Cooling

Depending on the desired part shape, calibration may be needed in combination with cooling to maintain the product shape during cooling. For this specific process, the cooling time and temperature required will vary depending on the part shape and target temperature at stretching. Temperature can be in a range from about 32° F. to 120° F. depending on the polymer chosen. The cooling and heating may also depend on part geometry. In an example, cooling time is from about 50 sec to 25 min. Cooling can be performed using, for example, a water spray tank.

Extrusion Speed Control

After removing the desired amount of heat from the part, a piece of process equipment generally known as a "haul-off" or "puller" can be used to control the speed of the extrudate. The pulling speed and the extrusion rate can match closely to manufacture a well formed part. Moreover, in the process, the puller or haul-off is can resist pulling forces on the outlet side, in addition to the force required to move the part from the extrusion die through calibration, if used, and the cooling section. Electromechanical controls for accomplishing this speed control using what is known as "braking" may be used. As the extrudate passes from the extrusion speed control device to the stretching die, the part can be under considerable tension, which must be resisted. Common devices for this purpose include but are not limited to: godet stands for parts that are flexible enough to pass through them, cleated pullers, belted pullers, wheel pullers and reciprocating pullers.

Temperature Conditioning

To adequately control the temperature throughout the part, additional heating or cooling can be included for a time sufficient to obtain a substantially even temperature distribution inside the part. This temperature conditioning may constitute a simple insulated section, in a component such as a simple insulated tunnel to allow the temperature to stabilize inside the extrudate; additional cooling with water or air, hot air or infrared ovens for heating or a combination thereof. The desired temperature at the end of stabilization will depend on the specific orientable thermoplastic polymer used as the continuous phase and to a lesser extent the temperature behavior of the filler phase(s). The temperature window for stretching depends on the materials used.

Oriented Symmetric or Asymmetric Polymer Composite

Embodiments of the die drawing systems and methods of the present disclosure are useful for fabricating oriented polymeric articles having shapes that remain substantially the same despite changes in draw rate.

The resultant monolithic oriented polymer composite produced by solid state non-proportional die drawing process according to some embodiments of the present disclosure generally can have a higher tensile strength and modulus with desirable density of about 0.3 to 0.9 g/cc and coefficient of linear expansion of about $25 \times 10^{-6}$ in/in/° F. than the initial billet.

By varying parameters of the solid state die drawing process, such as temperature, pressure and die contours, properties of oriented composite material can be changed. The properties of oriented polymer composite material can also be changed by varying amounts of filler, and by changing the composition of filler. In some embodiments, this can affect the physical properties of composite material, such as for instance, color, texture, electrical conductivity, glow in the dark properties, and fire retardancy.

The oriented product of composite material can be manipulated in order to meet a manufacturer's specifications with regards to the final commercial application. The oriented composite product can be cut and shaped during the solid state non-proportional die drawing process. In an embodiment, composite material can be extruded as an oriented product of varying specifications; however it can also be extruded as a sheet for use in residential or commercial applications for indoor and outdoor applications.

In one embodiment, the oriented dimensionally accurate composite material may have a simple profile with one or more smooth surfaces or may have complicated profiles with multiple edges and one or more smooth surfaces.

In another embodiment, the oriented composite article may have striations of filler formed in a dispersion pattern with a wood-grain appearance and the resultant oriented product may resemble hard wood flooring and can be adapted to be used in residential or commercial applications as such.

The non-proportional die drawing process disclosed here can provide a new composite material, an apparatus and a method for extruding the composite material. Embodiments of the disclosure include the initial mixing of a binding agent and a filler to produce a feedstock which is subsequently extruded as a billet of a composite material. The oriented composite material can be stronger and more durable then the starting materials. The composite material also can contain striations of the filler which allows the manufacturer to produce a composite material that can reflect the image of a natural product and can be used in residential or commercial applications such as for instance floor coverings, decking, siding, trim, fascia, railing, fencing, door and window jambs, window shutters, furniture, etc. The properties of the composite material can also be changed, in order to meet the requirements for the residential or commercial application of the product, by the incorporation of different types of filler and by varying the amount of filler used. In some embodiments, the OPC composition can comprise inorganic fillers such as calcium carbonate, preferably about 60%-70%. In other embodiments, the OPC composition comprises recycled scrap, preferably up to about 50%. In other embodiments, the OPC composition comprises a blend of virgin and recycled polypropylene, preferably with about 5%-50% recycled polypropylene.

Tongue & Groove Feature

In some embodiments, a strip of oriented polymer composite material can be provided having parallel upper and lower faces with first and second parallel edges extending between the upper and lower faces. The first edge can have a tongue extending therefrom with parallel upper and lower surfaces. The second edge can have a groove extending thereinto with parallel opposite sides. The tongue and the groove can be of complementary nature for the tongue of the first strip to be into registration with the groove of an adjacent strip to resist lateral separation between the first strip, and the adjacent strips by interference between the upper and lower surfaces and the parallel opposite sides.

In another embodiment, appropriate attaching means, such as a snap lock, or tongue and groove, can be tooled in to the oriented material to create a product that can be attached in series in a residential or commercial application, such as for instance flooring, decking etc.

EXAMPLES

In order to better understand the attributes of embodiments of the disclosure, it will now be described with reference to the following examples. These examples are illustrative only and are not intended to limit the scope of the disclosure.

Example 1

In one example, the non-proportional die as observed in FIG. 2 has an entrance opening large enough to fit an initial polymer composition, in some embodiments in the form of a billet. Initial dimensions of the billet were picked for a nominal draw ratio of four.

The properties of the oriented end product produced by drawing are significantly different than those produced by extrusion. By way of example, a starting billet was first formed by combining a wood fiber plastic concentrate containing 60% wood particles of about 60 mesh size and 50% polypropylene with virgin polypropylene in a 1:1 ratio. This yielded a composition having about 30% wood fiber and 70% polypropylene. The resulting combination was heated and extruded to form the billet.

The billet was of rectangular cross-section measuring about two inches by two inches (2"×2"). The billet was heated in an oven to about 150° C. (i.e. close to but below the melting point of polypropylene which is about 160° C.) and transferred to the pressure chamber and initially forced through the die. The extruded material was then grasped using the clamp and drawn at a rate of about 4 ft./min. (Four feet per minute) and once it had been entirely drawn through the die, allowed to cool into the oriented end product. The draw ratio (i.e. the initial cross-sectional area divided by the final cross-sectional area) was 10:4.

The oriented end product bore a remarkable similarity both in look and in feel to wood. The oriented end product diminished in density by about half compared to the starting billet. The density of the oriented end product was about 0.59 g/cc (grams per cubic centimeter) compared to a density of about 1 g/cc for the starting billet.

The oriented end product could be shaped as if it were wood and in planing and sawing behaved very much like wood producing shavings remarkably like wood shavings and sawdust remarkably like wood sawdust. The oriented end product received both nails and screws without splitting much like wood.

In testing, the oriented end product was found to have a density and flexural strength not unlike wood and a modulus of elasticity of about half that of wood. Typical properties were a density of 0.059 g/cc, flexural strength of 6,353 lb/in$^2$ and a modulus of elasticity of 799,298 lb/in$^2$. Unlike wood however the oriented product was substantially non adsorptive to water.

Although testing was carried out using a starting billet, the process can be automated In one embodiment of making a symmetric or asymmetric oriented polymer composite article, there constitutes a method of extruding a orientable polymer composite material. A binding agent also termed as a polymer matrix, and a filler are placed in a feeder of the solid state extrusion process. The feeder feeds a predetermined volume of filler and binding agent into a melt extruder. In an embodiment, the feeder is a gravimetric feeder controlled by an external CPU. Melt extruder mixes filler and binding agent to form feedstock, as is well known to those of skill in the art. The feedstock is subsequently extruded as a billet of the composite material The billet is extruded through a die into a first column. The first column is fed through a first haul off into a continuous furnace where its temperature is adjusted to a drawing temperature. The first haul off acts against the extrusion direction to maintain extrusion pressure and to support the column. The temperature adjusted first column is fed into a non-proportional drawing die at the exit of which, it is reduced in size to a second column. The second column is grasped by a suitable haul off such as sold under the trademark CATERPILLAR as it exits the drawing die. The haul off then pulls the second column at a desired rate to form an oriented composite article.

Test Results

Table 1 illustrates the properties of certain oriented polymer composite articles made from solid state non-proportional die drawing process according to embodiments of the disclosure. The properties of the oriented end product produced by drawing are significantly different than those produced by extrusion.

In testing, the oriented end product was found to have a density and flexural strength not unlike wood and a modulus of elasticity of about half that of wood. Typical properties were a density of 0.059 g/cc, flexural strength of 6,353 lb/in$^2$ and a modulus of elasticity of 799,298 lb/in$^2$. Table 1 provides the mechanical and physical properties of an oriented polymer composite made from a solid state drawing process using a non-proportional adjustable and tapered draw die according to one embodiment of the disclosure.

TABLE 1

| Mechanical and Physical Properties | |
| --- | --- |
| Tensile Strength, PSI (ASTM D 638-10) | 12300-12800 |
| Tensile Modulus, PSI (ASTM D638-10) | 309000-327000 |
| Flexural Strength, PSI (ASTM D790-10) | 5000-5490 |
| Flexural Modulus, PSI (ASTM D790-10) | 356000-385000 |
| Coefficient of Linear Expansion, in/in/° F. | $2 \times 10^{-6}$-$25 \times 10^{-6}$ |
| Density, g/cc (ASTM D792-08) | 0.637-0.639 |

These outcomes further support the basis that and helps attain the desired strength and durability features in the oriented polymer composite product made from a non-proportional draw die process.

The test results further support the concept that a substantially non-proportional draw die which accommodates an unbalanced polymer flow, produces an oriented, dimensionally accurate, polymer composite that is comparable or better than oriented polymer composite articles taught in prior art.

Although embodiments have been described with reference only to selected examples, it will be appreciated by those skilled in the art that the they may be embodied in many other forms.

Provided herein are various non-limiting examples of composition, materials, and methods of preparing an oriented polymer composite and non-proportional die. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separated from others.

What is claimed is:

1. A solid state draw die for drawing an oriented polymer composition comprising:

a non-proportional drawing channel configured for drawing a polymer composition to form symmetric or asymmetric oriented polymer composite profiles, said non-proportional drawing channel comprising a die inlet and a die outlet, wherein the die inlet and the die outlet are connected by a convergence angle of 5 to 20° in a primary dimension, wherein an aspect ratio of the die inlet is less than an aspect ratio of an inlet profile of the polymer, an aspect ratio of the die outlet is less than an aspect ratio of an outlet profile of the polymer so as to inhibit a natural flattening of the inlet profile of the polymer during the drawing process;

wherein an aspect ratio of a first cross sectional area of the non-proportional drawing channel is different from an aspect ratio of a second cross sectional area of the non-proportional drawing channel by at least about 5%;

wherein the non-proportional drawing channel induces an unbalanced flow of the polymer composition with a nominal draw ratio of at least four resulting in a non-proportional deformation of the polymer composition to form an oriented polymer composite profile; and wherein the oriented polymer composite profile has a density of about 0.3 to 0.9 g/cc, and has a coefficient of linear expansion of $25 \times 10^{-6}$ in/in/° F. or less.

2. The solid state draw die of claim 1, wherein the convergence angle is about 7 to 18°.

3. The solid state draw die of claim 1, wherein the convergence angle is about 10 to 15°.

4. The solid state draw die of claim 1, wherein the draw die does not require an axisymmetric deformation of the polymer composition or a proportional deformation throughout the die.

5. The solid state draw die of claim 1, wherein the aspect ratio of the die inlet is different than the aspect ratio of the die outlet.

6. The solid state draw die of claim 5, wherein the aspect ratio of the die inlet is different from the aspect ratio of the die outlet by at least about 5%.

7. The solid state draw die of claim 1, wherein dimensions of the die outlet are linked to dimensions of the oriented polymer composite profile by a fixed ratio.

* * * * *